United States Patent [19]

Miller

[11] 3,925,651

[45] Dec. 9, 1975

[54] CURRENT MODE ARITHMETIC LOGIC ARRAY

[75] Inventor: Homer W. Miller, Peoria, Ariz.

[73] Assignee: Honeywell Information Systems Inc., Phoenix, Ariz.

[22] Filed: Mar. 26, 1975

[21] Appl. No.: 562,316

[52] U.S. Cl. .................................. 235/175; 307/216
[51] Int. Cl.² ............................................ G06F 7/50
[58] Field of Search ...................... 235/175; 307/216

[56] References Cited

UNITED STATES PATENTS 3,700,875 10/1972 Saenger et al. ..................... 235/175

OTHER PUBLICATIONS

MECL 10,000, Motorola Inc., 1972, pp. 3–7, 26.

*Primary Examiner*—R. Stephen Dildine, Jr.
*Attorney, Agent, or Firm*—Edward W. Hughes

[57] ABSTRACT

An arithmetic logic array employing soft-saturating current mode logic gates receives two binary input signals and a binary operation mode signal and includes a half-adder and logic function portion for generating half-sums of the input signals and carry generate signals, a carry look-ahead portion for generating carrys in response to half-sum and carry generate inputs, and a portion for combining the half-sums and carrys to produce a resultant binary output. Another portion may be included to produce carry generate and propagate signals useful with a separate look-ahead carry array.

8 Claims, 20 Drawing Figures

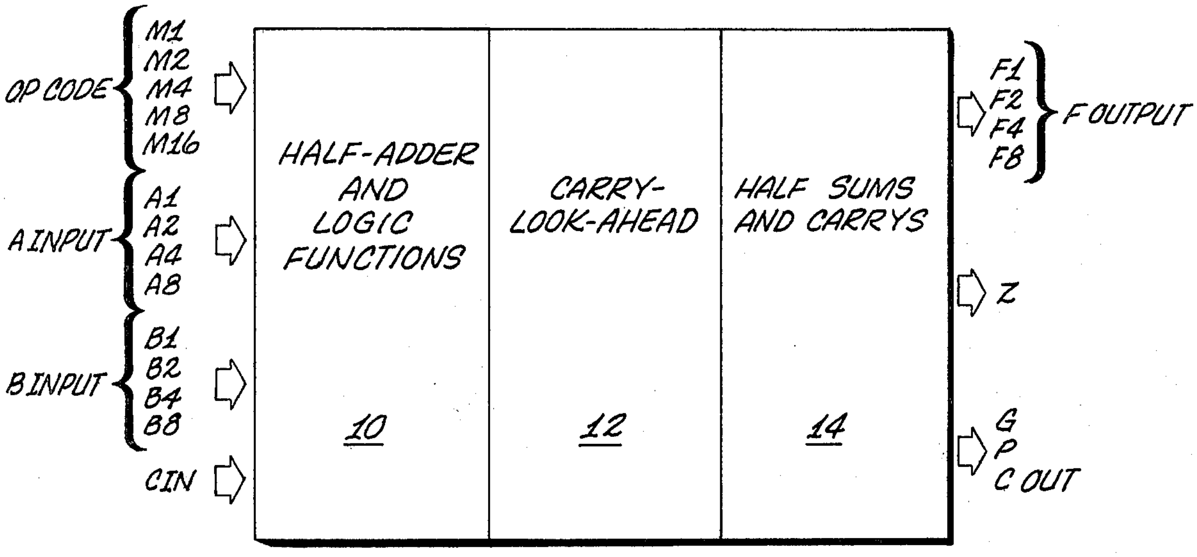

FIG-1

| OPERATIONAL MODES | |
|---|---|
| M00 : | $F = A$ |
| M01 : | $F = A+B$ |
| M02 : | $F = A+\overline{B}$ |
| M03 : | $F = 1$ |
| M04 : | $F = A \cdot B$ |
| M05 : | $F = B$ |
| M06 : | $F = \overline{A \oplus B}$ |
| M07 : | $F = \overline{A}+B$ |
| M08 : | $F = A \cdot \overline{B}$ |
| M09 : | $F = A \oplus B$ |
| M10 : | $F = \overline{B}$ |
| M11 : | $F = \overline{A}+\overline{B}$ |
| M12 : | $F = 0$ |
| M13 : | $F = \overline{A} \cdot B$ |
| M14 : | $F = \overline{A} \cdot \overline{B}$ |
| M15 : | $F = \overline{A}$ |
| M16 : | F = A PLUS C |
| M19 : | F = C MINUS 1 |
| M22 : | F = A MINUS B PLUS C MINUS 1 |
| M25 : | F = A PLUS B PLUS C |
| M28 : | F = 2A PLUS C |
| M31 : | F = A PLUS C MINUS 1 |

FIG-2

CURRENT MODE ARITHMETIC LOGIC ARRAY

FIELD OF THE INVENTION

This invention relates generally to electronic logic circuitry, and more particularly to arithmetic circuitry employing current mode logic.

BACKGROUND OF THE INVENTION

Advancements in the technology of digital computation are coming at the systems level via programming techniques and at the hardware level through improved circuit technology including processing and packaging as well as logic circuit design.

The logic employed in digital circuits may be either voltage mode or current mode. Heretofore, voltage mode logic (e.g. diode-transistor logic and transistor-transistor logic), wherein the voltage level of a signal imports the content, has been predominant. However, with increases in computer speed now being limited to a large extent by circuit operation time, the inherent delay attendant with transistor saturation in voltage mode logic presents a limiting parameter.

Current mode logic, wherein logic is transmitted through currents, overcomes some of the limitations of voltage mode logic. For example, fewer circuit elements and less supply power is required than for voltage logic. And importantly, "soft saturating" gates may be employed which permit increased circuit speed.

OBJECTS OF THE INVENTION

An object of the present invention is an improved arithmetic logic circuit employing current mode logic.

Another object of the invention is an arithmetic logic circuit with multifunction operations.

Still another object of the invention is an arithmetic logic array which lends itself to large-scale integration in semiconductor processing.

Yet another object of the invention is an arithmetic logic array which may be interconnected with similar arrays to expeditiously process large binary numbers.

SUMMARY OF THE INVENTION

The arithmetic logic array in accordance with the present invention has a logic portion including a half-adder and other logic function capabilities for two binary inputs, a carry look-ahead portion, and a half-sum and carry portion. Means are provided for two binary inputs, a mode control input, and a carry input. A binary output resultant of the logic function and a carry output are provided. Additionally, the arithmetic logic array may be interconnected with other similar arrays for operating on larger binary numbers, and propagate, generate, and the carry output are provided to expedite such operations.

Importantly, each portion of the arithmetic logic array comprises a soft saturating current mode gate as a basic circuit element. Several variations of the gate, depending on inputs and functions, are utilized in building subcircuit arrays which are combined to provide the larger arithmetic logic circuit array.

These and other objects and features of the invention will be more fully understood from the following detailed description and appended claims when taken with the drawings.

BRIEF DESCRIPTION OF THE DRAWINGS

FIG. 1 is a functional diagram of an arithmetic logic array in accordance with the present invention;

FIG. 2 is a table of the operational modes of the arithmetic array of FIG. 1;

DESCRIPTION OF A PREFERRED EMBODIMENT

Figure 3A:
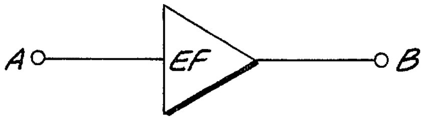
FIGS. 3a–10b are logic diagrams and equivalent electrical circuits of basic elements employed in the arithmetic logic element of the present invention.

Referring now to the drawings, FIG. 1 is a functional block diagram of the arithmetic logic array in accordance with the present invention. Basically, the array comprises three portions including a half-adder and a logic function portion 10, a carry and look-ahead portion 12, and a half-sum and carry portion 14.

Generally, portion 10 functions in response to a binary operation code M1-M16 to logically manipulate the corresponding binary bits of an A input (A1-A8) and a B input (B1-B8). Additionally, a carry input $C_{in}$, is provided to portion 10 when the array is used in combination with at least one other array. Each of the circuit elements in portion 10 generates two output signals, a half-sum and a generate carry, which are provided to and utilized by the carry look-ahead portion 12 which generates carry signals for the binary levels 2, 4, 8 and 16. The carry signal for level 1 is the carry input, $C_{in}$.

The half-sum and carry portion 14 utilizes the carry outputs and half-sums generated by portions 12 and 10, respectively, along with an operation code input, and generates a binary output, F1-F8, in accordance with the logic function defined by the input operation code. Additionally, portion 14 provides a Z output which indicates equivalence of the A and B inputs. Further, portion 14 produces a generate (G), a propagate (P), and a carry out ($C_{out}$) which have utility when the array of FIG. 1 is used in combination with other arrays and particularly with a unique look-ahead carry functional array which is described and claimed in related application 562327. Use of the G and P outputs is unique to the operation of the look-ahead carry array and utilization thereof is described in detail therein. The carry out ($C_{out}$) signal is utilized when the array of FIG. 1 is employed with other arrays and with the carry look-ahead array of application 562327. In such an arrangement, the carry out signal provides the carry input to the succeeding arithmetic logic array.

A number of operational modes are available with the arithmetic logic array of the present invention. Referring to FIG. 2, a table of the operational modes utilized in the preferred embodiment is given for 22 modes. It will be appreciated that the mode number is defined by the binary operation code input to the array, and a total of 32 modes are available. However, the 22 listed modes are the more useful. The logic symbols used in the table of FIG. 2 are conventional and recognized in the art. For example, in mode 1 the output F equals A OR B; in mode 4 F equals A AND B; in mode 9 F equals A Exclusive OR B. Realization of the operational modes will be more fully understood from the detailed description and logic equations hereinbelow.

As stated above, the arithmetic logic array in accordance with the present invention employs soft saturating current mode logic gates including several basic circuit building blocks, the most elemental of which are illustrated in FIGS. 3–10. In these figures the logic diagram or symbol is illustrated along with a schematic of the equivalent electrical circuits. As will be described, a series gate including a lower level gate and an upper level gate is provided which has an output voltage swing of only approximately 0.5 volt. This limited voltage swing reduces power requirements and reduces transition time.

Figure 3B:
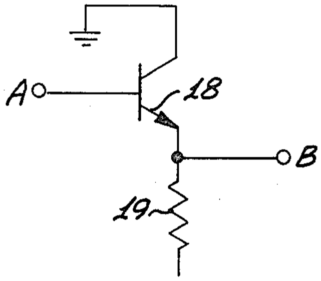

FIG. 3*a* is the symbol for an emitter follower with an input A and an output B and which is typically employed in a circuit where the signal at A has a large fan-out or is applied as the input to a plurality of circuits. The equivalent electrical circuit is shown in FIG. 3*b* where the input A is applied to the base of transistor 18 and the output B is taken at the common terminal of resistor 19 and the emitter of transistor 18.

Figure 4A:
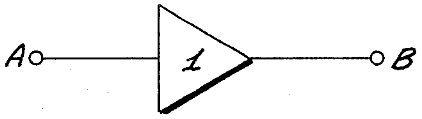
Figure 4B:
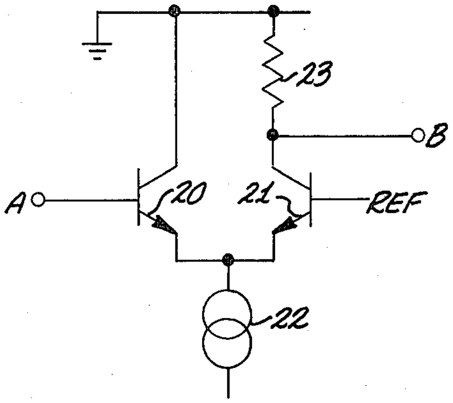

FIG. 4*a* is a buffer wherein input A is applied unchanged at the output B but which provides isolation between points A and B. In the electrical schematic of FIG. 4*b* input A is applied to the base of transistor 20 and the output B is taken at the collector of transistor 21. The emitters of transistors 20 and 21 are connected to current source 22, and the collector of transistor 20 is connected directly to ground and the collector of transistor 21 is connected through resistor 23 to ground. In operation and assuming a negative logic wherein O volt corresponds to a binary "O" and a –0.5 volt corresponds to a binary "1", a reference voltage of –0.26 volt is applied to the base of transistor 21. With NPN bipolar transistors as illustrated a binary 0 at input A causes conduction of transistor 20 and nonconduction of transistor 21 whereby the binary 0 is reflected as a 0 current at output B. Conversely, a binary "1" at input A renders transistor 20 nonconductive and transistor 21 is conductive thereby reflecting a binary "1" current at the output B.

Figure 5A:
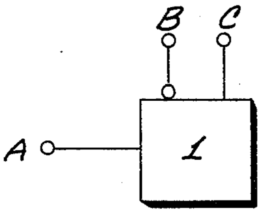
Figure 5B:
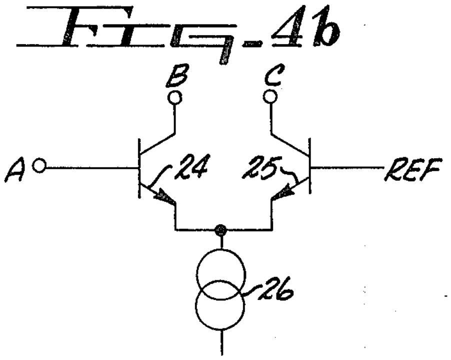

FIG. 5*a* is a lower level gate buffer with an input A, a real output C and a complement output B. In the electrical schematic of FIG. 5*b* input A is applied to the base of transistor 24, a reference voltage of approximately –1.06 volts is applied to the base of transistor 25, and the common emitters of transistors 24 and 25 are connected to current source 26. Output B is taken at the collector of transistor 24 and output C is taken at the collector of transistor 25.

Figure 6A:
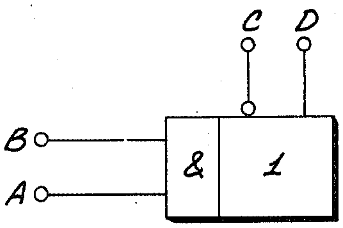
Figure 6B:
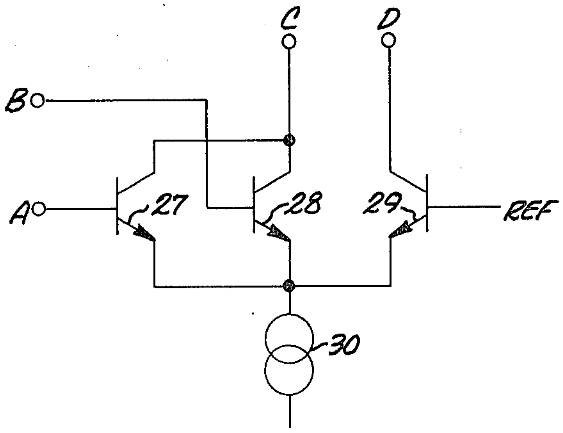

FIG. 6*a* is another lower level gate with inputs A and B and a real (AND) output D and a complement (NAND) output C. In the electrical schematic of FIG. 6*b* the A and B inputs are applied to the bases of transistors 27 and 28, respectively, and a reference voltage of about –1.06 volts is applied to the base of transistor 29. The emitters of the transistors are connected in common to current source 30 and the D ($\bar{A}.\bar{B}$) output is taken at the collector of transistor 29 and the C (A.B) output is taken at the common terminal of the collectors of transistors 27 and 28.

Figure 7A:
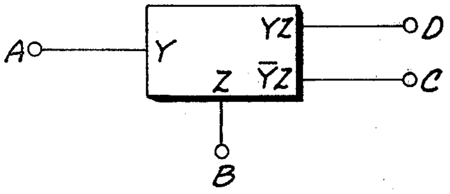
Figure 7B:
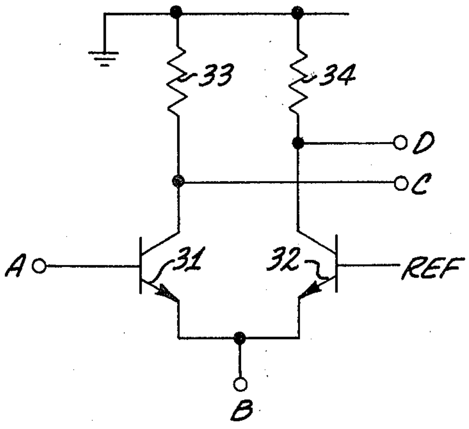

The upper level gate in FIG. 7 has inputs A and B applied to terminals Y and Z, respectively, with the C and D outputs providing a $\bar{Y}$.Z and a Y.Z output, respectively. In the equivalent electrical schematic of FIG. 7*b* input A is applied to the base of transistor 31 and input B is applied to the common terminal of the emitters of transistors 31 and 32. A reference voltage of –0.26 volt is applied to the base of transistor 37, and the collectors of transistors 31 and 32 are connected through resistors 33 and 34, respectively, to ground. The C output is taken at the collector of transistor 31 and the D output is taken at the collector of transistor 32.

Figure 8A:
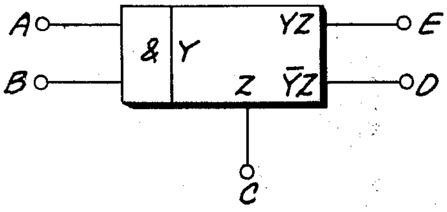
Figure 8B:
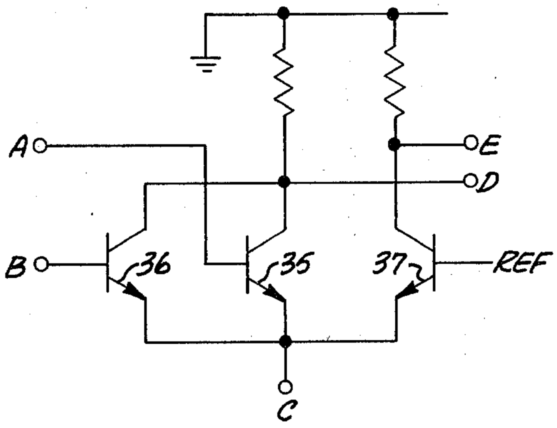

The upper level gate in FIG. 8*a* is similar in function to FIG. 7*a* but with the Y variable being the AND function of inputs A and B and the Z function being the input C. Thus, output E equals A.B.C. and output D equals $\bar{A}.\bar{B}$.C. In the electrical equivalent of FIG. 8*b*, the A and B inputs are applied to the bases of transistors 35 and 36, respectively, the C input is applied to the common terminal of the emitters of transistors 35, 36, and 37; the D output is taken at the common terminal of the collectors of transistors 35 and 36; and the E output is taken at the collector of transistor 37. For current to flow through the E output, inputs A and B must both be a "1" or –0.5 volt (thus rendering transistor 37 conductive) and input C must be present. Otherwise, if either the A or B inputs are a binary "0" (0 volt) and the Z input is present current will flow through output terminal D.

The upper level gates of FIG. 7 and 8 are used in combination with the lower level gates of FIGS. 5 and 6. As described, the reference voltage for the upper level gates is –0.26 volt and the logic inputs being either 0 volt or –0.5 volt. The output voltage swings between 0 and –0.5 volt. Inputs to the lower level gates are derived from emitter followers, and the consequent voltage translation necessitates a reference voltage of –1.06 volts therefor.

Figure 9A:
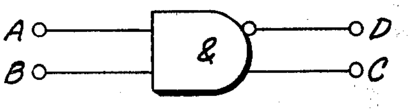
Figure 10A:
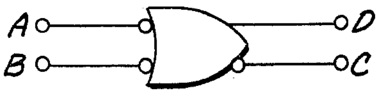

The logic diagrams of FIGS. 9 and 10 are equivalent wherein FIG. 9A performs an AND function on the inputs A and B with the real output provided at C and the complement or NAND output provided at D. The OR gate of FIG. 10 is equivalent in function wherein the A and B inputs are inverted prior to application to the OR gate with output D being real (A + B) and output C being inverted (A.B).

Figure 10B:
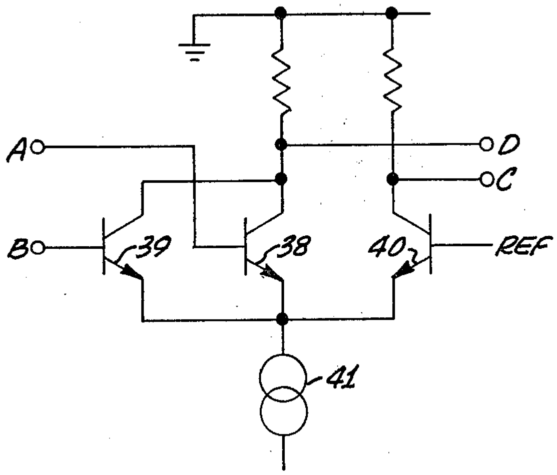

In the equivalent schematic circuit of FIG. 10b, the A and B inputs are applied to the bases of transistors 38 and 39, respectively, and a reference voltage is applied to the base of transistor 40. A current source 41 is connected to the common terminal of the emitters of transistors 38, 39, and 40; the C output is taken at the collector of transistor 40 and the D output is taken at the common terminal of the collectors of transistors 38 and 39. If the inputs A and B are both binary "1" then output C becomes a binary "1" due to current through transistor 40. If inputs A and B are not both binary "1", then output D becomes a binary "1" due to current through either transistor 38 or 39.

Figure 11:
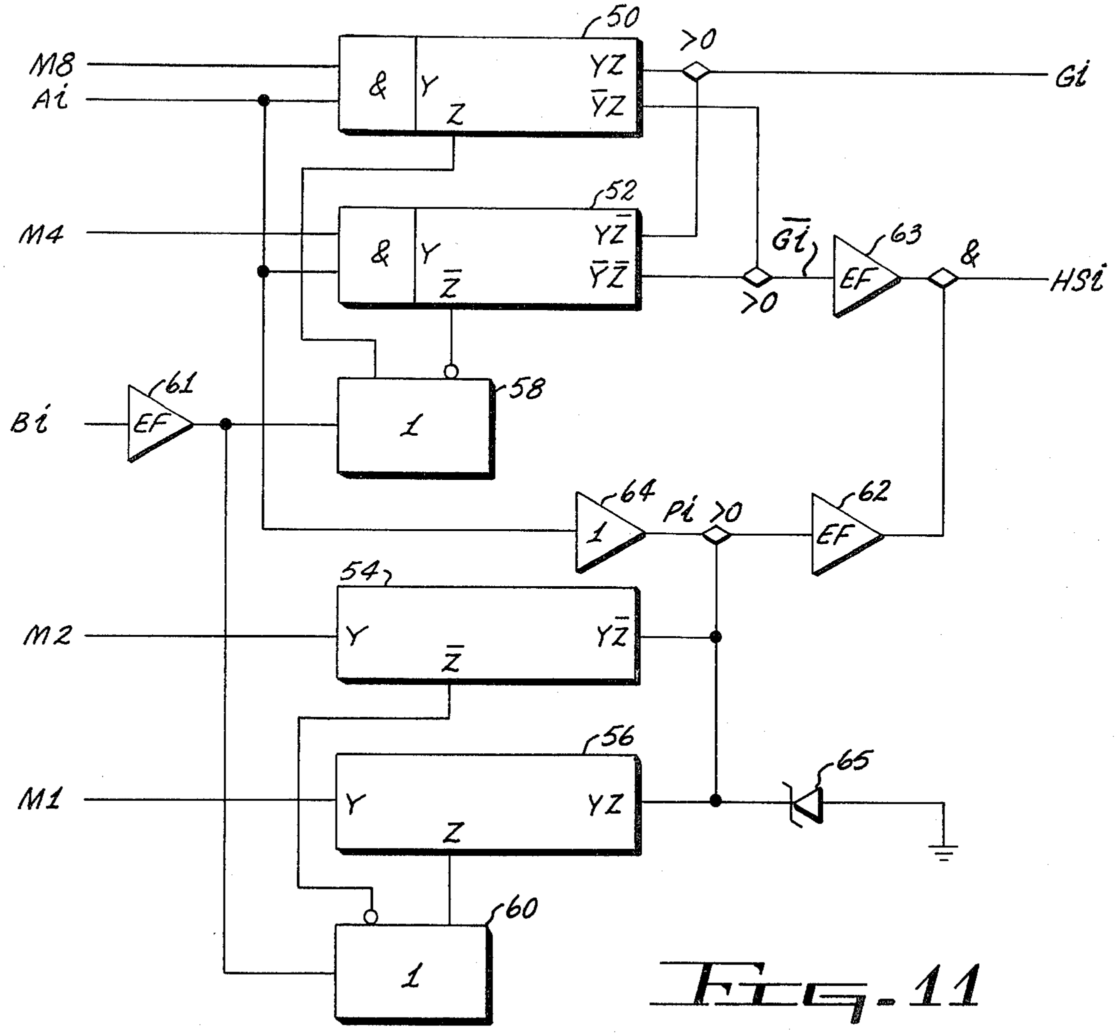
FIG. 11 is a schematic of a larger circuit employed as a building block in the half-adder and logic function portion of the arithmetic logic array.
Figure 12:
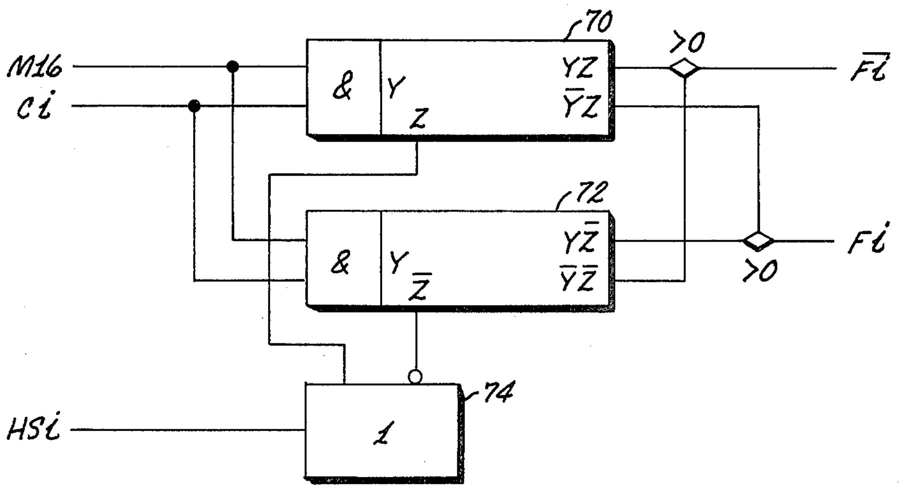
FIG. 12 is a schematic of a circuit employed as a building block in the half-sum and carry portion of the arithmetic logic array.

With these basic functional elements, defined by logic diagram and equivalent circuits, consider now the larger building block circuits utilized in the half-adder and logic function portion 10 and the half-sum and carry portion 14 of the arithmetic logic array as illustrated, respectively, in FIGS. 11 and 12.

Referring now to the half-adder and logic function circuit of FIG. 11, functional elements 50 and 52 correspond to the element in FIG. 8*a*, and functional elements 54 and 56 correspond to the functional element of FIG. 7. Buffers 58 and 60, corresponding to functional element in FIG. 5, provide the real and complementary $B_i$ inputs to elements 50 and 52 and elements 54 and 56, respectively. The operational code inputs M1-M8 are applied as inputs to the circuit along with the binary bit $A_i$ and the binary bit $B_i$ wherein i may be 1, 2, 4, or 8. Emitter followers 61, 62, and 63 along with buffer 64 provide fan-out and buffering in the interconnections of the elements 52–60. Further, with negative logic convention and the use of NPN transistors, the interconnected emitter followers 62 and 63 perform an AND function, as labeled. A Schottky diode 65 is connected between ground and the outputs of elements 54 and 56 to limit the negative voltage excursion at the outputs of these two elements.

The circuit provides two outputs: a generate carry, $G_i$, at the connection of the Y.Z output of element 50 and the $Y.\overline{Z}$ output of element 52; and a half-sum, $HS_i$, at the connection of the output of the $\overline{Y}.\overline{Z}$ output of element 52, the $\overline{Y}.Z$ output of element 50, (the OR connection $G_i$, being applied through emitter follower 63), and the output of emitter follower 62. A propagate signal, $P_i$, is provided at the outputs of elements 54 and 56 and the output of buffer 64.

The half-sum output, $HS_i$, may be a "1" (always without generation of a carry) or "0" (with or without the generation of a carry). The generate, $G_i$, output effects the generation of a carry in the carry look-ahead portion of the arithmetic logic array as will be described hereinbelow.

Operation of the circuit array of FIG. 11 is defined by the following logic equations and tables:

For i = 1,2,4,8:
Gi = (M8.Ai.Bi) + (M4.Ai.$\overline{\text{Bi}}$)
Pi = (Ai) + (M2.$\overline{\text{Bi}}$) + (M1.Bi)
HSi = $\overline{\text{Gi}}$.Pi

| M8 | M4 | Gi | $\overline{\text{Gi}}$ | M2 | M1 | Pi |
|---|---|---|---|---|---|---|
| 0 | 0 | 0 | 1 | 0 | 0 | Ai |
| 0 | 1 | Ai.$\overline{\text{Bi}}$ | $\overline{\text{Ai}}$ + Bi | 0 | 1 | Ai + Bi |
| 1 | 0 | Ai.Bi | $\overline{\text{Ai}}$ + $\overline{\text{Bi}}$ | 1 | 0 | Ai + $\overline{\text{Bi}}$ |
| 1 | 1 | Ai | $\overline{\text{Ai}}$ | 1 | 1 | 1 |

Figure 13:
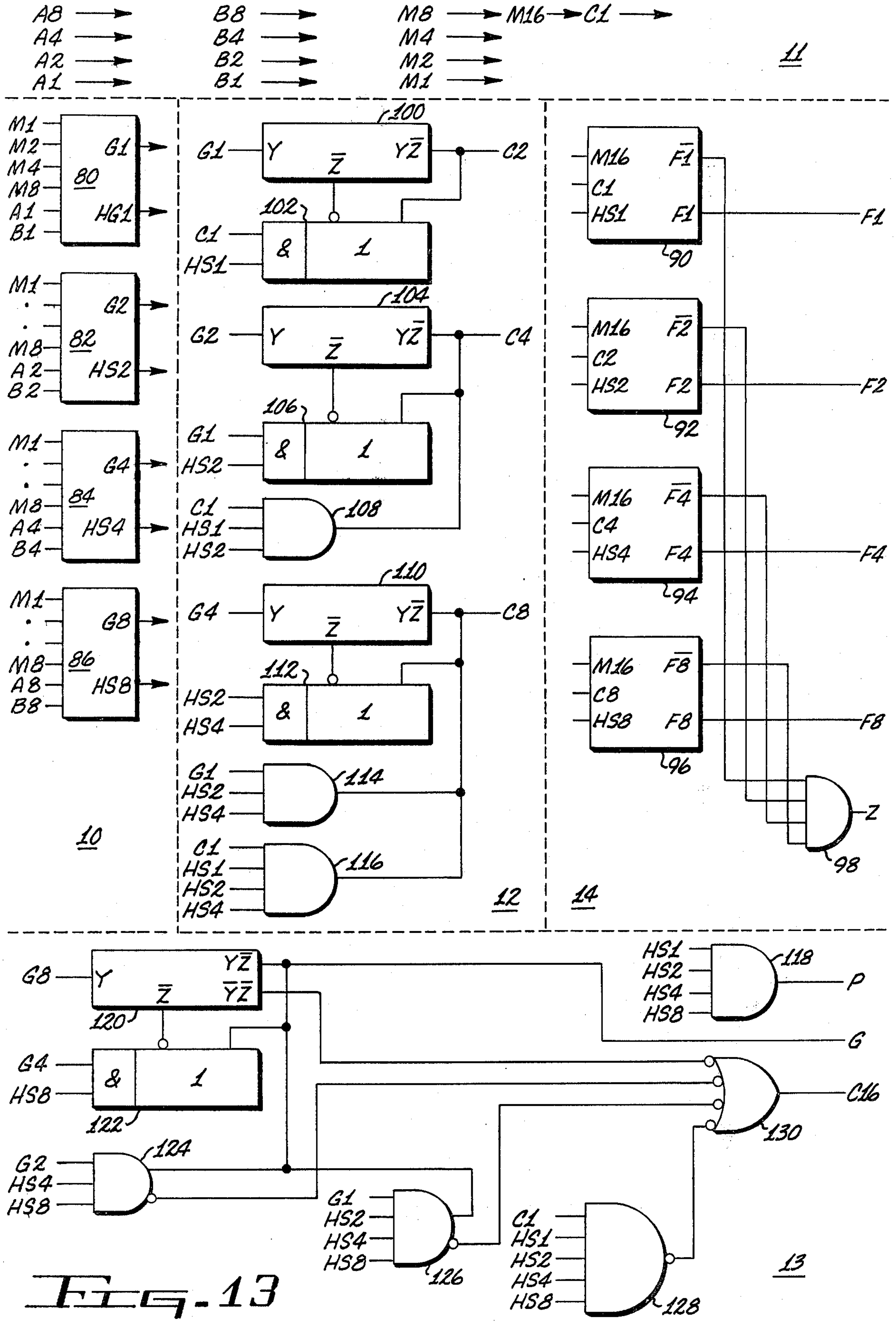
FIG. 13 is a functional block diagram and schematic of the arithmetic logic array illustrated with the building blocks of FIGS. 3–12.

Referring now to FIG. 12 the circuit building block for the half-sum and carry portion 14 of the arithmetic logic array is illustrated in functional block diagram and includes elements 70 and 72 which correspond to the functional element in FIG. 8. Mode signal M16 and the carry input, $C_i$, are applied as inputs to the two circuits 70 and 72 with the Z and $\overline{Z}$ inputs to the respective circuits being provided by the half-sum, $HS_i$, taken through buffer 74 with the real output connected to circuit 70 and the complement output connected to circuit 72. The outputs of the two circuit elements 70 and 72 are interconnected to provide outputs signals $F_i$ and $\overline{F_i}$ in accordance with the following equation:

$F_i = \overline{Y}.Z + Y.\overline{Z}$
$\overline{F_i} = Y.Z + \overline{Y}.\overline{Z}$
Substituting the inputs for Y and Z,
$F_i = HS_i \oplus M16.C$ With the circuit building blocks for the half-adder and logic function portion 10 and the half-sum and carry portion 14 illustrated in FIGS. 11 and 12, respectively, the arithmetic and logic array of FIG. 1 is shown in greater detail in FIG. 13 which employs the logic elements of FIGS. 3–10 and the circuit building blocks of FIGS. 11 and 12. For simplicity, the various portions are not shown interconnected, but the interconnections are implicit from the identified inputs and outputs. As above described, all inputs to the lower level gates are derived from emitter followers. The inputs A1-A8 and B1-B8 along with Operation Code M1-M16 are illustrated generally at 11.

The half-adder and logic function portion 10 includes circuits 80, 82, 84, and 86 each of which corresponds to the circuit illustrated in FIG. 11 with each circuit receiving the op code inputs M1-M8 and the corresponding binary bits of the inputs A and B (e.g. A1 and B1, A2 and B2, A4 and B4, A8 and B8) and producing the outputs G1 and HS1, G2 and HS2, G4 and HS4, and G8 and HS8.

The half-sum and carry portion 14 include circuits 90, 92, 94, and 96, each of which corresponds to the circuit building block shown in FIG. 12. Circuit 90 operates on the least significant binary bits and produces the binary output F1, circuit 92 operates on the second binary bits and produces the output F2, circuit 94 operates on the third binary bits and produces output F4, and circuit 96 operates on the fourth and most significant binary bits and produces the output F8.

Additionally, the Z output, corresponding to F1-F8 = 0 is derived through AND-gate 98 which receives as inputs the complement output of each of circuits 90-96, whereby Z = $\overline{\text{F8}}.\overline{\text{F4}}.\overline{\text{F2}}.\overline{\text{F1}}$ The circuits in portion 14 receive the M16 op code input, the half-sum output from the corresponding circuit in the portion 10, and carry inputs derived from the carry look-ahead portion 12.

Referring to the carry look-ahead portion 12, carry 2, C2, is derived from inputs G1, C1 and HS1 which are applied to logic elements 100 and 102, corresponding to the elements in FIG. 7 and FIG. 6, respectively.

Similarly, carry 4 (C4) is generated from inputs G2, G1, HS2, C1, HS1, and HS2 which are applied to logic elements 104, 106, and AND gate 108.

Carry 8, C8, is derived from inputs G4, HS2, HS4, G1, HS2, HS4, C1, HS1, HS2, and HS4 which are applied to logic elements 110 and 112 and to AND gates 114 and 116.

The carrys C2, C4, and C8 which are produced by the carry look-ahead portion 12 are defined by the following equations:

| | | | | | | |
|---|---|---|---|---|---|---|
| C2 = | (HS1.C1) | + | (G1) | | | |
| C4 = | (HS2.HS1.C1) | + | (HS2.G1) | | (G2) | |
| C8 = | (HS4.HS2.HS1.C1) | + | (HS4.HS2.G1) | + | (HS4.G2) | + (G4) |

The propagate, P, and the generate, G, signals useful with the look-ahead carry array described and claimed in related application number 562327, along with the carry C16 are generated by the circuitry shown in area 13 of FIG. 13. The propagate signal, P, is generated simply by AND gate 118 to which are connected inputs HS1, HS2, HS4, and HS8, whereby

P = HS1.HS2.HS4.HS8.

The generate, G, signal and the carry C16 are generated by logic elements 120 and 122 which correspond to the logic elements in FIG. 7 and FIG. 6, respectively, along with AND gates 124, 126, and 128. The inputs to element 120 are G8 and the complement output of element 122. G4 and HS8 are provided as inputs to element 122. AND gate 124 has the three inputs G2, HS4, and HS8; AND gate 126 has the four inputs G1, HS2, HS4, and HS8; and AND gate 128 has the five inputs C1, HS1, HS2, HS4, and HS8. The complement outputs from gates 124, 126, and 128 along with the $Y.\overline{Z}$ output of element 120 are applied as inputs (inverted) to NOR gate 130 with the output of NOR gate 130 being the carry C16. The generate signal, G, is provided at the $Y.\overline{Z}$ output of elements 120.

The generate, G, signal and the carry C16 may be expressed by the following logic equations:

$$C16 = (HS8.HS4.HS2.HS1.C1) + (HS8.HS4.HS2.G1) + (HS8.HS4.G2) + (HS8.G4) + (G8)$$

$$G = (HS8.HS4.HS2.G1) + (HS8.HS4.G2) + (HS8.G4) + (G8)$$

The arithmetic logic circuit in accordance with the present invention has proved to be versatile with its multifunctional operation, and the current mode logic used therein provides improved operation. Further, the circuit elements lend to large-scale integration in semiconductor processing thus allowing high density construction. While the invention has been described with reference to a specific embodimient, the description is illustrative and is not to be construed as limiting the scope of the invention. Various modifications and changes may occur to those skilled in the art without departing from the true spirit and scope of the invention as defined by the appended claims.

I claim:

1. A current mode arithmetic logic array comprising:

a first array portion for receiving a carry input, a binary operation code, and first and second binary signal inputs and producing half-sum of said inputs and carry generate output signals in response to said binary operation code, a second array portion receiving said carry input, said half-sums and said carry generate signals and producing carry signals for each binary level of said first and second signals other than the least significant binary level, and a third array portion responsive to said half-sum signals from said first portion, said carry signals from said second portion, and said operation code and producing a binary output resultant of the operation defined by said operation code on said first and second binary signals, said first, second, and third portions comprising soft saturating current mode logic series gates including a lower level gate and an upper level gate having an output voltage range limited to approximately 0.5 volt.

2. A current mode arithmetic logic array as defined by claim 1 wherein said binary operation code is defined by the following table:

| | |
|---|---|
| M00: $F = A$ | M12: $F = 0$ |
| M01: $F = A+B$ | M13: $F = \overline{A}.B$ |
| M02: $F = A+\overline{B}$ | M14: $F = \overline{A}.\overline{B}$ |
| M03: $F = 1$ | M15: $F = \overline{A}$ |
| M04: $F = A.B$ | M16: F = A plus C |
| M05: $F = B$ | M19: F = C minus 1 |
| M06: $F = \overline{A + B}$ | M22: F = A minus B plus C minus 1 |
| M07: $F = \overline{A}+B$ | M25: F = A plus B plus C |

-continued

| | |
|---|---|
| M08: $F = A.\overline{B}$ | M28: F = 2A plus C |
| M09: $F = A + B$ | M31: F = A plus C minus 1 |
| M10: $F = \overline{B}$ | |
| M11: $F = \overline{A}+\overline{B}$ | |

where m is the operation mode,
A, B are binary inputs,
F is the binary output, and
C is the carry input.

3. A current mode arithmetic logic array as defined by claim 1 wherein said first portion comprises a number of first circuits corresponding to the number of binary bits in the largest binary input and wherein each circuit receives a binary bit from each input signal and binary bits from said operation code and in response thereto produces a half-sum and a carry generate for said binary input signal bits.

4. A current mode arithmetic logic array as defined by claim 3 wherein said operation code includes bits M1, M2, M4, M8, and M16 and said binary inputs each include four bits, and said first circuits each produce carry generate, $G_i$, propagate, $P_i$, and half-sum, $HS_i$, signals as defined by $$G_i = (M8.A_i.B_i) + (M4.A_i.\overline{B}_i)$$

$$P_i = (A_i) + (M2.\overline{B}_i) + (M1.B_i)$$

and $$HS_i = \overline{G}_i.P_i$$

where $A_i$ and $B_i$ are bits of equal significance in inputs A and B.

5. A current mode arithmetic logic array as defined by claim 4 wherein said third portion comprises a number of circuits corresponding to the number of binary bits in the largest binary input and wherein each circuit receives a half-sum, $HS_i$, and a carry, $C_i$, and an operation mode bit, M16, and in response thereto produces an output bit, $F_i$, in accordance with the following equation:

$$F_i = HS_i \oplus (M16.C_i)$$

6. A current mode arithmetic logic array is defined by claim 5 wherein said second portion generates carrys C2, C4, and C8 in accordance with the following equations:

$$C2 = (HS1.C1) + (G1)$$

$$C4 = (HS2.HS1.C1) + (HS2.G1) + (G2)$$

$$C8 = (HS4.HS2.HS1.C1) + (HS4.HS2.G1) + (HS4.G2) + (G4).$$

7. A current mode arithmetic logic array as defined by claim 6 and further including current mode logic means for producing an array carry out signal, $C_{out}$, as defined by $$C_{out} = (HS8.HS4.HS2.HS1.C1) + (HS8.HS4.HS2.G1) + (HS8.HS4.G2) + (HS8.G4) + (G8).$$

8. A current mode arithmetic logic array as defined by claim 7 and further including current mode logic means for producing a propagate out signal, P, and a generate carry signal, G, as defined by $$P = HS1.HS2.HS4.HS8$$ and $$G = (HS8.HS4.HS2.G1) + (HS8.HS4.G2) + (HS8.G4) + (G8).$$

* * * * *